(No Model.) 2 Sheets—Sheet 1.

E. C. MATHEWS.
CLAMP FOR FENCE MACHINES.

No. 604,999. Patented May 31, 1898.

(No Model.) 2 Sheets—Sheet 2.

E. C. MATHEWS.
CLAMP FOR FENCE MACHINES.

No. 604,999. Patented May 31, 1898.

Witnesses
Simon L. Messer.
Walter Williams

Inventor
Elisha C. Mathews
by Bishop & Imirie.
Attorneys

UNITED STATES PATENT OFFICE.

ELISHA C. MATHEWS, OF JACKSONVILLE, ILLINOIS.

CLAMP FOR FENCE-MACHINES.

SPECIFICATION forming part of Letters Patent No. 604,999, dated May 31, 1898.

Application filed September 7, 1897. Serial No. 650,728. (No model.)

*To all whom it may concern:*

Be it known that I, ELISHA C. MATHEWS, a citizen of the United States, residing at Jacksonville, in the county of Morgan and State of Illinois, have invented certain new and useful Improvements in Fence-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My present invention relates to improvements in the mechanism for drawing a woven-wire fence from the fence-machine, and is intended more particularly for use on a fence-machine of the type shown in Letters Patent granted to me March 2, 1897, No. 578,252.

The invention consists in certain novel features hereinafter described and claimed.

Figure 1:
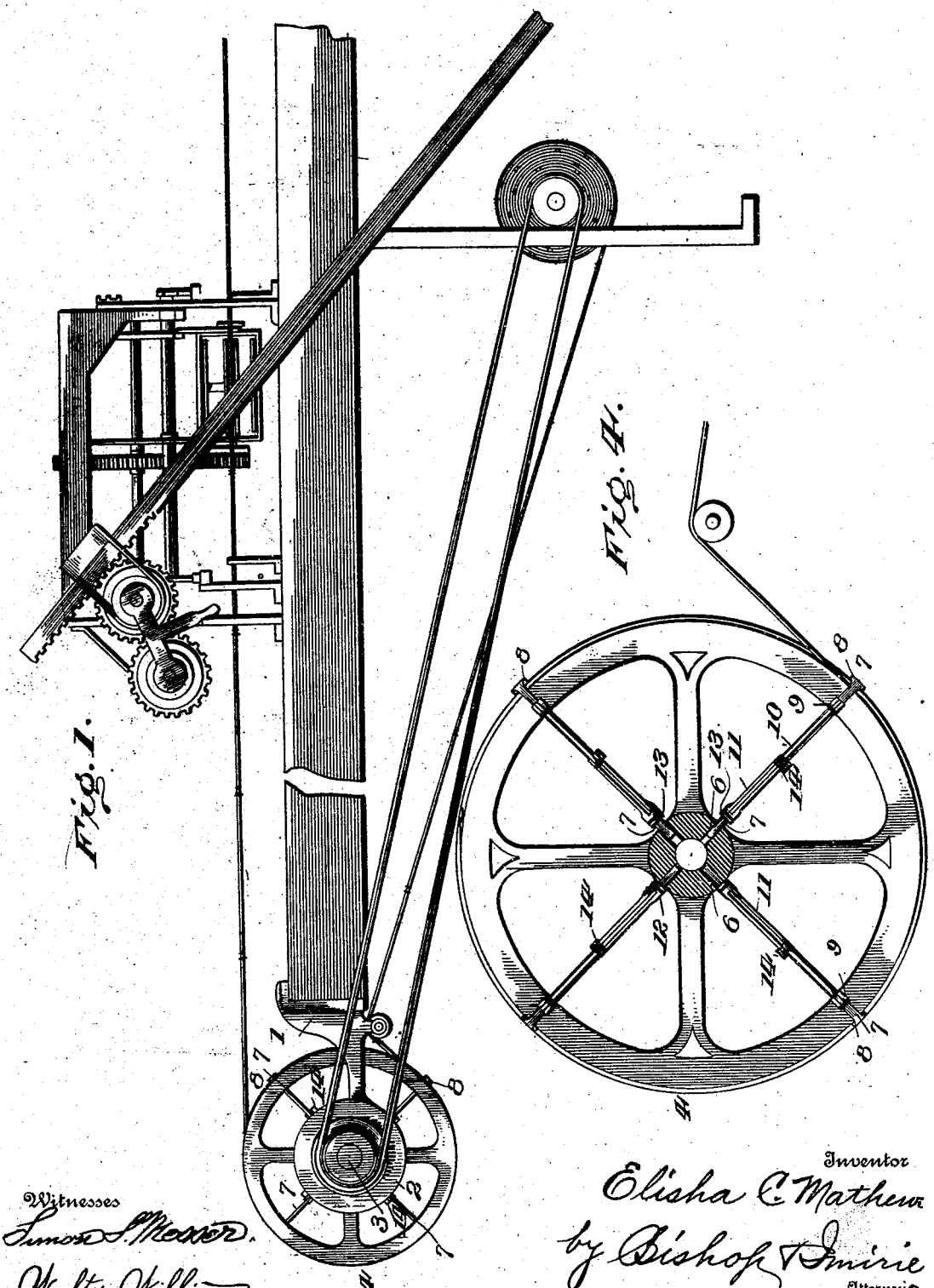
Figure 2:
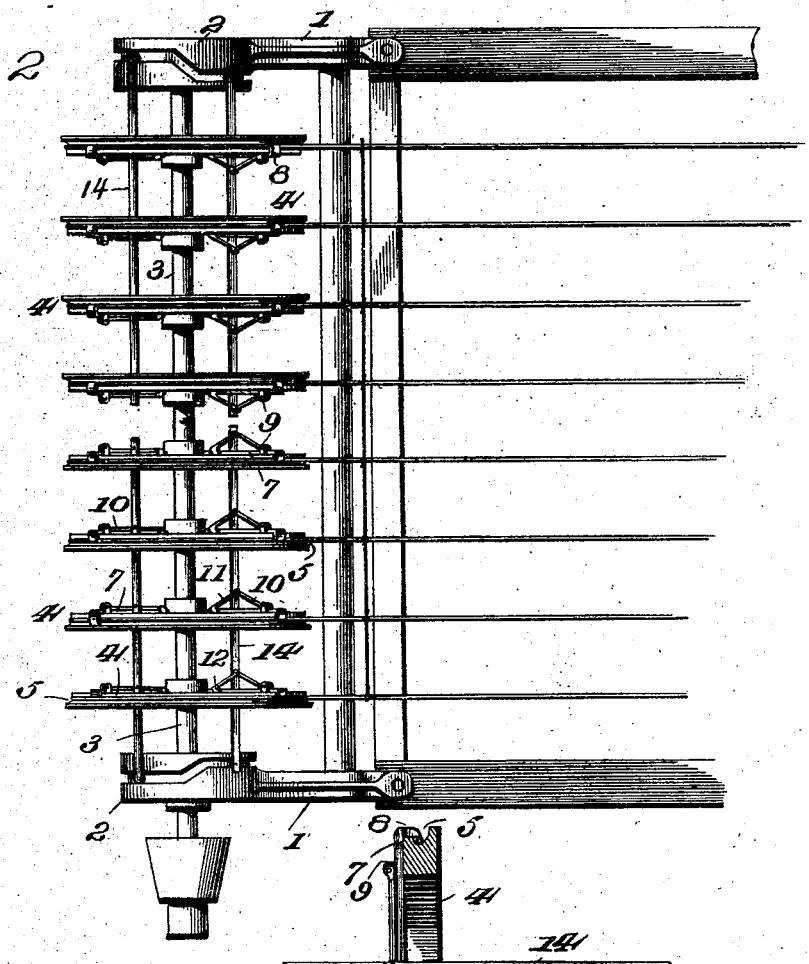
Figure 3:
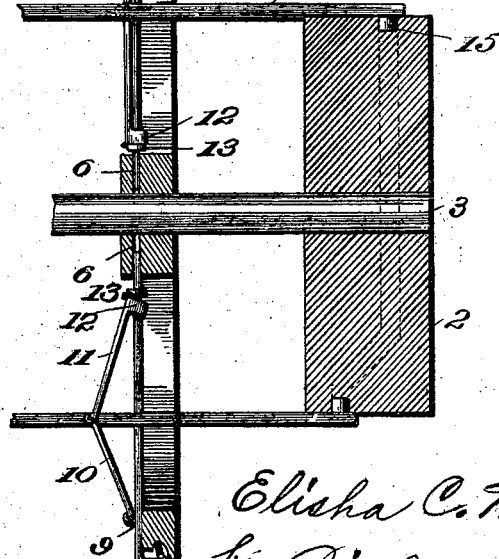

In the annexed drawings, which fully illustrate my invention, Figure 1 is a side elevation of a portion of a fence-machine with my present improvements applied thereto. Fig. 2 is a plan view of the same. Fig. 3 is a sectional view, on a larger scale, of one of the spools over which the woven fence is drawn;
and Fig. 4 is a side elevation of the same.

The frame of the fence-machine and the wire-twisting mechanism may be of any preferred construction and form no part of my present invention.

On the end of the machine I secure to the frame the brackets 1, having their free ends formed into enlarged cam-disks 2, as clearly shown. A shaft 3 is journaled in and extends between said cam-disks, and upon the said shaft I rigidly secure a series of spools or reels 4, corresponding in number to the number of longitudinal wires usually woven in the fence by the machine. Each of the spools or reels has an annular groove 5 in its periphery adapted to receive the wire, and in its hub I form a series of notches or sockets 6. These sockets 6 serve as bearings to guide and hold the wire-clasping arms 7, which have their inner ends engaged in said sockets and adapted to slide freely therein and their outer ends formed into fingers 8, projecting over the rim of the spool and adapted to press the wire thereagainst. The outer portion of the wire-clasping arm passes the lugs or ears 9 on the side of the spool and is guided thereby in its movements. The outer member 10 of a toggle-lever is fulcrumed between said lugs, and the inner member 11 of said lever has its inner end formed into an eye 12, which encircles the arms 7 and bears against a collar or shoulder 13 on said arm. The members 10 and 11 of the toggle-lever are pivoted together and to a rod 14 by a common pivot, the said rod being provided at its outer end with a roller 15, engaging the groove in the cam-disk 2. The rods 14 may extend continuously through the entire series of spools, but to distribute the strain equally to the two sides of the machine I prefer to provide two sets of the rods, each being connected to the arms on one-half the spools—that is to say, each set of rods operates the arms on one side of the central longitudinal line of the machine.

It is thought the operation of the machine will be readily understood. The woven fence passes from the wire-twisting mechanism over the spools to the drum, on which it is wound for use. As the wire passes over the spool it is clasped thereto by the arms, and thereby prevented from slipping from the spool. As the shaft 3 is rotated the spools and arms carried thereby are simultaneously rotated, and each arm as it reaches the highest point of its revolution is brought toward the spool and caused to clasp the wire by reason of the operating-rod being reciprocated by the groove in the cam-disk. The reciprocation of the rod brings the members of the toggle-lever into alinement, thereby forcing the eye 12 against the shoulder 13 and carrying the arm inward. The finger at the end of the arm is thus brought against the wire and holds the same against the spool. After the arm has traveled about two-thirds of a revolution the reciprocating rod is again operated by the cam-disk and the toggle-lever bent, whereupon the arm drops away from the wire by gravity, so that the wire is free to leave the spool and pass to the drum.

The device is very simple in its construction, and by its use the wires are drawn positively from the machine, while at the same time they are prevented from slipping from the spools. Bucking of the fence as it is drawn from the machine is consequently entirely obviated.

Having thus described my invention, what I claim, and desire to secure by Letters Patent, is—

1. In a fence-machine, the combination with the wire-supporting spools, of clasping-arms mounted on the spools and adapted to press the wires against the edges of the same.

2. In a fence-machine, the combination with the wire-supporting spools, of clasping-arms mounted on the sides of the same and adapted to press the wires against the edges of the spools, and means for forcing said arms upon the wires.

3. In a fence-machine, the combination with the wire-supporting spools, of clasping-arms carried by the said spools, toggle-levers fulcrumed on the spools and engaging the said arms, and means for operating the said levers.

4. In a fence-machine, the combination with the wire-supporting spools, of clasping-arms carried thereby and adapted to engage the wires, toggle-levers fulcrumed on the spools and engaging the arms, reciprocating rods pivotally joined to the toggle-levers, and cam-disks adapted to operate said rods.

In testimony whereof I affix my signature in presence of two witnesses.

ELISHA C. MATHEWS.

Witnesses:
CHARLES A. BARNES,
LENA C. ENGEL.